United States Patent
Hsu et al.

(10) Patent No.: US 6,372,085 B1
(45) Date of Patent: *Apr. 16, 2002

(54) RECOVERY OF FIBERS FROM A FIBER PROCESSING WASTE SLUDGE

(75) Inventors: Jay Chiehlung Hsu, Alpharetta, GA (US); Sheng-Hsin Hu, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/216,235

(22) Filed: Dec. 18, 1998

(51) Int. Cl.⁷ .................................................. D21C 5/02
(52) U.S. Cl. ............................................... 162/4; 162/21
(58) Field of Search .......................... 162/4, 5, 18, 21, 162/52, 190, 242, 191, DIG. 7, DIG. 9; 261/5; 210/928

(56) References Cited

U.S. PATENT DOCUMENTS

| | | |
|---|---|---|
| 1,422,251 A | 7/1922 | Billingham |
| 2,697,661 A | 12/1954 | Hollis |
| 2,889,242 A | 6/1959 | Teichmann |
| 2,977,274 A * | 3/1961 | Hollis |
| 3,057,769 A | 10/1962 | Sandberg |
| 3,644,170 A | 2/1972 | Mekata et al. |
| 3,785,920 A | 1/1974 | Johansen ..................... 162/19 |
| 3,939,066 A | 2/1976 | Bauer |
| 4,050,899 A | 9/1977 | Grube et al. |
| 4,100,016 A | 7/1978 | Diebold et al. |
| 4,163,687 A | 8/1979 | Mamers et al. |
| 4,235,707 A | 11/1980 | Burke, Jr. |
| 4,261,836 A | 4/1981 | Koglin |
| 4,312,701 A | 1/1982 | Campbell |
| 4,461,648 A | 7/1984 | Foody |
| 4,540,467 A | 9/1985 | Grube et al. |
| 4,600,545 A | 7/1986 | Galli et al. |
| 4,645,541 A | 2/1987 | DeLong |
| 4,699,691 A | 10/1987 | Villavicencio |
| 4,751,034 A | 6/1988 | DeLong et al. |
| 4,798,651 A | 1/1989 | Kokta |
| 4,934,608 A | 6/1990 | Sylla et al. |
| 4,983,258 A * | 1/1991 | Maxham ..................... 162/189 |
| 5,022,984 A | 6/1991 | Pimley et al. |
| 5,114,540 A | 5/1992 | Law |
| 5,122,228 A | 6/1992 | Bouchette et al. |
| 5,217,576 A * | 6/1993 | Van Pham ..................... 162/158 |
| 5,262,003 A | 11/1993 | Chupka et al. |
| 5,262,004 A | 11/1993 | Gilbert et al. |
| 5,344,573 A | 9/1994 | Hill et al. |
| 5,401,361 A | 3/1995 | Prough et al. ................. 162/17 |
| 5,527,432 A * | 6/1996 | Leuthold et al. ............ 162/139 |
| 5,674,360 A | 10/1997 | Wyllie ......................... 162/52 |
| 5,755,926 A * | 5/1998 | Hankins et al. ................. 162/6 |
| 6,071,380 A | 6/2000 | Hoffman ..................... 162/190 |

FOREIGN PATENT DOCUMENTS

| | | |
|---|---|---|
| AU | 9229615 | 8/1993 |
| CA | 564700 | 10/1958 |
| EP | 0557651 A1 | 9/1993 |
| GB | 476569 | 12/1937 |
| JP | 4-73281 | 3/1992 |
| SU | 1437450 A1 | 11/1988 |
| WO | WO 98/27269 | * 6/1998 |

* cited by examiner

Primary Examiner—Dean T. Nguyen
(74) Attorney, Agent, or Firm—Dority & Manning, PA

(57) ABSTRACT

A process of recovering a useful population of fibers and fines from the waste stream of fiber processing facility is disclosed. Steam explosion of the fiber-containing waste stream is used to increase the separation efficiency of the fibers from the ash. The steam explosion also enhances the quality of the recovered fibers and fines, providing a population of recovered fibers which can be incorporated into the fiber component of a tissue or absorbent paper product.

20 Claims, 10 Drawing Sheets

RECOVERY OF FIBERS FROM A FIBER PROCESSING WASTE SLUDGE

FIELD OF THE INVENTION

This invention relates to a process for recovering a usable population of fibers and fines from the waste sludge of a fiber production or fiber handling facility.

In particular, this invention provides a steam explosion process and a resulting product which permits the separation of a useful population of fibers and fines from the waste streams of fiber production processes such as a waste paper recovery operation or from the waste stream of a paper making process. The process is useful in fiber and fine recovery from white water waste streams from paper making operations and waste sludge from the de-inking and processing of waste paper. The present invention not only increases the amount of usable fibers and fines recoverable from the waste stream, but increases the fiber quality of the recovered fibers. Additional benefits include a concomitant reduction in the solid volume of the waste stream and increases the usable fiber content available from the initial raw material. The process steps of the present invention yield a fiber of improved quality suitable for making tissue products such as toilet and facial tissues, paper towels, and napkins.

DESCRIPTION OF THE PRIOR ART

Waste sludge from fiber production and paper making facilities typically contain numerous fibers and fines. In particular, efforts to recover the fibers and fines from the waste sludge streams of paper fiber recovery plants have been limited, in part, by the high ash content of the sludge. Conventional fiber screening techniques also retain the ash particulates. The high ash content renders the recovered fibers and fines undesirable for quality end products.

Paper is conventionally made by draining a low consistency dispersion of cellulose fiber pulp, fillers, and additives through a paper machine "wire" (essentially an endless mesh or sieve). A certain amount of solid material passes through the wire with the suspending water and is, thus, not retained in the wet paper web formed on the wire. The drained liquid suspension, known generally in the industry as "white water," carries entrained solid material. White water from which the suspended particles have been removed is reused in the paper making process to the extent possible.

Obviously, wastepaper, if it can be recycled, is a much cheaper and environmentally friendly source of wood pulp for making paper. Before wastepaper can be reused as recycle material, however, the wastepaper must be de-inked. De-inking processes remove inks and coating materials from the wood fibers. Thus, when recycled fibers, as opposed to virgin pulps, are used in the paper making process, the drained liquid suspension will contain additional types of waste materials such as inks and hot melt adhesives.

Unused white water and de-inking effluents must be treated before being discharged from the paper mill. Treatment normally involves passing the effluent through a clarifier, prior to which flocculated are added to promote sedimentation of solid material suspended in the water. A biological treatment with microorganisms is also commonly performed to reduce the biological oxygen demand (BOD) of the liquid effluent before it is discharged. As can be expected, disposal of the unused white water and de-inked effluents results in costs to the paper making facility.

The sediment accumulated in the clarifier is a sludge composed of pulp fibers, fiber particles or fines, fillers, pigments, and other miscellaneous debris such as grit, sand, plastic particles, general dirt. Many of the sludge components are fillers, pigments and the like that were added to the pulp during the sheet-forming process for the purpose of producing desired properties in the finished paper. Such properties include proper surface, opacity, strength and brightness. For example, finely ground inorganic fillers, such as talc, certain clays, calcium carbonate, blanch fixed, and titanium dioxide may be added to papers to improve surface smoothness, whiteness, printability and opacity. Sizing agents, such as soaps, gelatins, and rosins (with alum), wax emulsions and starches, may be added to papers for improving resistance to penetration by liquids. In addition, coloring agents, such as acid, basic, direct and sulfur dyes and natural and synthetic pigments may be added for coloring purposes. Any of such products may ultimately end up in the clarifier as part of the sludge. In addition, because the clarifier is usually a large open air tank, other debris such as leaves, branches, insects, etc. Can also become part of paper sludge. The major constituents of the sludge, however, are generally fiber/fines and the inorganic fillers calcium carbonate and clay.

Most de-inking processes involve the use of flotation and washing. In de-inking processes, wastepaper is first washed and then pulled with dilute sodium hydroxide or surfactants in a pulpier tank to cause the fibers to swell and loosen the ink and coating material particles contained thereon. (These coating materials include the previously mentioned clays, talc, etc.) After pulling, the pulp stocks go through screening, cleaning, washing, floatation, and bleaching to further remove trash, stickiest, inks, ash, and short fiber fines. During the washing and floatation stages, most ash, stickiest, and short fiber fines are separated from the pulp stock. Thus, when the sludge comes from a mill using recycled waste paper, this sludge may also have accumulations of adhesives (otherwise known as "stickiest"), foreign bodies (such as pieces of plastic material or metal, otherwise known as "contraries") in very small quantities, and other additives, such as those described above, that are used in the paper making process.

Normally, the sludge is drawn off from the clarifier at about 2.5 percent consistency (or "percent dry solids content") and is then dewatered to a consistency of around 20 to 55 percent, for example, by means of rotary vacuum filters, screw presses, or belt presses. Dewatering reduces the weight of material going to the landfill and reduces the charges for landfill disposal because these are typically based on weight. Since the majority of the weight in the sludge comes from water, it behooves the sludge processor to remove as much water as possible. The dewatered sludge is in a semi-solid state and usually contains about 40 percent to about 80 percent by dry weight relatively fine wood fibers and from about 20 percent to about 60 percent inorganic (also referred to as "ash") and the additives mentioned above. The material typically is a crumbly, not very cohesive material that appears to be dry. At thirty percent consistency, most sludges are more like dry solids as opposed to a suspension or dispersion. Because of the non-cohesive character of sludge, the materials handling equipment for moving, storing and transporting are generally the same as for dry materials. Once in this state, the sludge is then capable of being collected and transported for disposal in landfills.

According to some sources, it is estimated that the amount of dry waste (waste sludge with substantially all of the residual water removed) produced due to paper processing exceeds 4.6 million tons per year. This sludge is produced by both paper making from virgin pulp and paper making from recycled fibers. A typical de-inking plant employing recycled fibers processes about 100 dry tons of waste paper into about 65 to about 80 dry tons of recycled (reusable) fiber. The remaining 20 to 35 tons of waste paper is unusable, and becomes part of the sludge produced by the deinking plant. After recycled fiber sludge is dewatered with various suitable dewatering devices, including, for example, a belt press or screw press, 100 dry tons of waste paper still produce from about 70 to about 120 wet tons of sludge which must be disposed.

Moreover, the sludge produced during the making of tissue from an integrated mill with a recycled fiber plant produces 10 times the amount of sludge produced during the making of tissue from virgin pulp. The typical virgin pulp tissue making process with a 200 ton capacity produces 10 tons of sludge per day while the typical tissue making with recycled fiber plant produces 100 tons of sludge per day.

Conventional methods for disposing of sludges include landfill, land spreading, composting and incineration. Landfill and land spreading sites are being depleted at an alarming rate, and the establishment of new sites is difficult due to environmental concerns. In addition, the cost associated with using landfills to dispose of sludge is constantly increasing. For example, paper manufacturers typically spend about $30/wet ton to send sludge to the landfill. Composting and incineration of sludge also raise environmental concerns. Some innovative sludge disposal techniques include processing the sludge into pellets for fuel or into lightweight aggregates for construction, pyrolysis, gasification, and incorporation into cements. However, these techniques generally require the use of complex methods and expensive equipment. In addition, attempts to recycle sludge to make paper have been unsuccessful because the process is inefficient due to drainage problems resulting from the presence of slow drying fines which tend to clog the wires and other equipment.

Due to the extremely large amounts of waste sludge generated from both the virgin pulp paper making and the recycled fiber paper making processes, new uses of sludge are needed in order to curtail the disposal problems presently being encountered. Some attempts have been made to create such uses.

The prior art sets forth basically five different approaches for utilizing sludge in useful products:

(1) Pelletizing the sludge using high pressure and binders where the sludge is dried before pelletizing. The pellets can be used as absorbents or chemical carriers, e.g., fertilizer. Alternatively, large diameter pellets or cylinders are used as fuel.

(2) Extracting the fibers or fillers from sludge in various ways to subsequently use the extracted material in a paper and/or ceramic product. These are both wet and dry processes.

(3) Mixing the sludge with other construction ingredients such as concrete or plastic to embody the sludge as reinforcing fibers or filler. Again these are both wet and dry processes.

(4) Direct molding of sludge into large shapes (i.e., large cross section) and drying. These products are construction blocks or boards and can be made using both wet and dry processes. Some of these can be fired to burn out the cellulosic and polymeric materials, leaving a ceramic product.

(5) Some sludges are formed into particulates or briquettes of various forms and sizes. These are subsequently carbonized to make an activated carbon product.

U.S. Pat. No. 4,303,019 to Haataja discloses the making of pellets by molding paper mill sludge blended with a fibrous reinforcing material. U.S. Pat. No. 5,215,625 to Burton discloses the making of products such as stepping stones, acoustic paneling, flower pots and planters, sculptures, shipping containers and packing materials, and the like, from waste products such as ink and waste slurry from pulp manufacturing. The incorporation of de-inking byproducts from wastepaper recycling. operations and pulp mill clarifier sludge into drywall and other gypsum-based building products is disclosed in U.S. Pat. No. 5,496,441 to Tran.

Attempts have also been made to recover and re-use the raw materials from paper mill waste sludge. For example, U.S. Pat. No. 5,478,441 to Hamilton, discloses a process for recovering such raw materials. U.S. Pat. No. 5,332,474 to Maxham discloses a process for producing a paper making filler product from the fiber fines/clay fraction of a pulp, paper, paperboard, or deinking mill waste solids.

While considerable prior art exists with regard to methods for handling, utilizing or recycling of sludge as outlined above, in actual fact there has been little commercial implementation. The majority of the materials classified as sludge from both deinking operations as well as conventional pulp and paper mills ends up in landfills or is discarded or disposed of in some other way. The major reason is that few of the many procedures available to convert sludges can produce products that have significant value.

The need to develop methods and processes that would use these waste materials, however, is growing. It is likely that environmental and regulatory pressures to recycle paper and paper products will increase. This will mean there will be more de-inking and recycling operations in the future. In addition, it is likely that the percentage of inorganic materials in recycled paper, such as calcium carbonate and clay, will increase for a number of reasons. For example, calcium carbonate improves the long term stability of printing papers because the alkalinity of the calcium carbonate reduces the rate of discoloration and embrittlement of the paper. Additionally, both calcium carbonate and clay are used to increase the opacity of paper. In printing items such as magazines or advertising supplements, addition of inorganic materials allows for reductions in the amount of fiber used for the paper. The purpose for the added inorganic material is to provide superior opacity. In addition to the improved opacity, incorporation of clay as a coating or filler and calcium carbonate as a filler also provide improvements to the surface of the paper such that the quality of the printing is improved. Furthermore, wood pulp, even though it is a renewable resource, is becoming more expensive. The cost of wood pulp currently exceed the cost of calcium carbonate or clay, and it, therefore, makes economic sense to include considerable amounts of these fillers in paper.

Steam explosion has been used to defiber paper material as described in U.S. Pat. No. 5,262,003 to Chupka et al. and in U.S. Pat. No. 4,312,701, which are both incorporated herein by reference. As further discussed in Chupka, non-fibrous contaminants subjected to the steam explosions have a reduced particle size and are more readily washed out of the fiber suspensions.

Steam explosion is also used in the defibration of wood chips as taught in U.S. Pat. No. 4,798,651 to Kokta, incorporated herein by reference. In Kokta, wood chips are chemically treated followed by steaming and explosive decompression to defibrate the chips.

In U.S. Pat. No. 4,163,687 to Mamers et al., a nozzle design is disclosed which is used in cellulosic defibration which increases usable fiber content from wood chips and results in less fiber damage.

In U.S. Pat. No. 5,262,004 to Gilbert, incorporated herein by reference, steam explosion is used as part of a chemical separation and recovering process of chemical preservatives from wood chips from previously treated wood.

U.S. Pat. No. 5,122,228 to Bouchette et al., incorporated herein by reference, discloses a steam explosion process which is used in the de-inking of waste paper. The temperature ranges used by Bouchette are reported to decrease particle size of contaminants and increase the ability to strip contaminants from the fibers.

Australian Patent Office Application AU-B-29615/92, corresponding to U.S. application Ser. No. 840,370 filed Feb. 24, 1992. now abandoned, discloses a steam explosion of mixed grades of high and low quality waste paper which have been delignified by alkaline digestion.

As will be seen from the description and illustrations to follow, none of the above-identified references discloses or anticipates the present invention directed to the process of treating waste sludge and waste liquor with steam explosion to increase the recoverable yield of fibers and fines from the waste stream. Further, none of the references teach or suggest that the useful fiber characteristics of an individual fiber can be improved for absorbent products by the steam explosion process.

SUMMARY OF THE INVENTION

The present invention recognizes and addresses some of the limitations of prior art fiber production in paper making processes which discard a large percentage of fibers and fines as an unsalvageable and/or non-useful waste material.

It is, therefore, a general object of the present invention to provide a process for recovering a useful population of fibers and fines from the waste stream of a fiber production, waste paper recycling, or paper making process. In carrying out the present process, it has been found that a steam explosion process may alter the morphology of fibers and fines contained within a waste stream, the altered morphology facilitating not only the separation of the fines from the waste stream, but improving their useful qualities in a paper product or paper making process.

The invention sets forth a process by which a supply of treated, recovered fibers and fines have superior fiber quality characteristics for absorbent products than similar untreated fibers and fines. The present invention enables both the volume and dry solid content of waste streams to be reduced by the recovery of additional fibers and fines from the waste stream. As a result, it is possible to increase the percentage of fibers and fines from the starting material. It is further possible to incorporate the increased percentage of fibers and fines into a finished paper product without lowering the quality of the finished product.

These and other useful objects of this invention are achieved by a process and resulting product which provides a waste sludge stream containing uncaptured fibers and fines from a fiber processing facility; subjecting the waste stream to an elevated temperature and pressure; explosively releasing the pressure from said waste stream; passing the now treated waste material through a filter recovery apparatus; and, separating a population of recovered fibers and a population of recovered fines from the waste stream.

Another aspect of the present invention concerns an absorbent structure comprising modified cellulosic fibers prepared by the process disclosed herein.

One embodiment of such an absorbent structure is a handsheet comprising the modified cellulosic fibers prepared by the process disclosed herein, wherein the handsheet is prepared by a wet laid process.

DETAILED DESCRIPTION OF A PREFERRED EMBODIMENT

Figure 1:
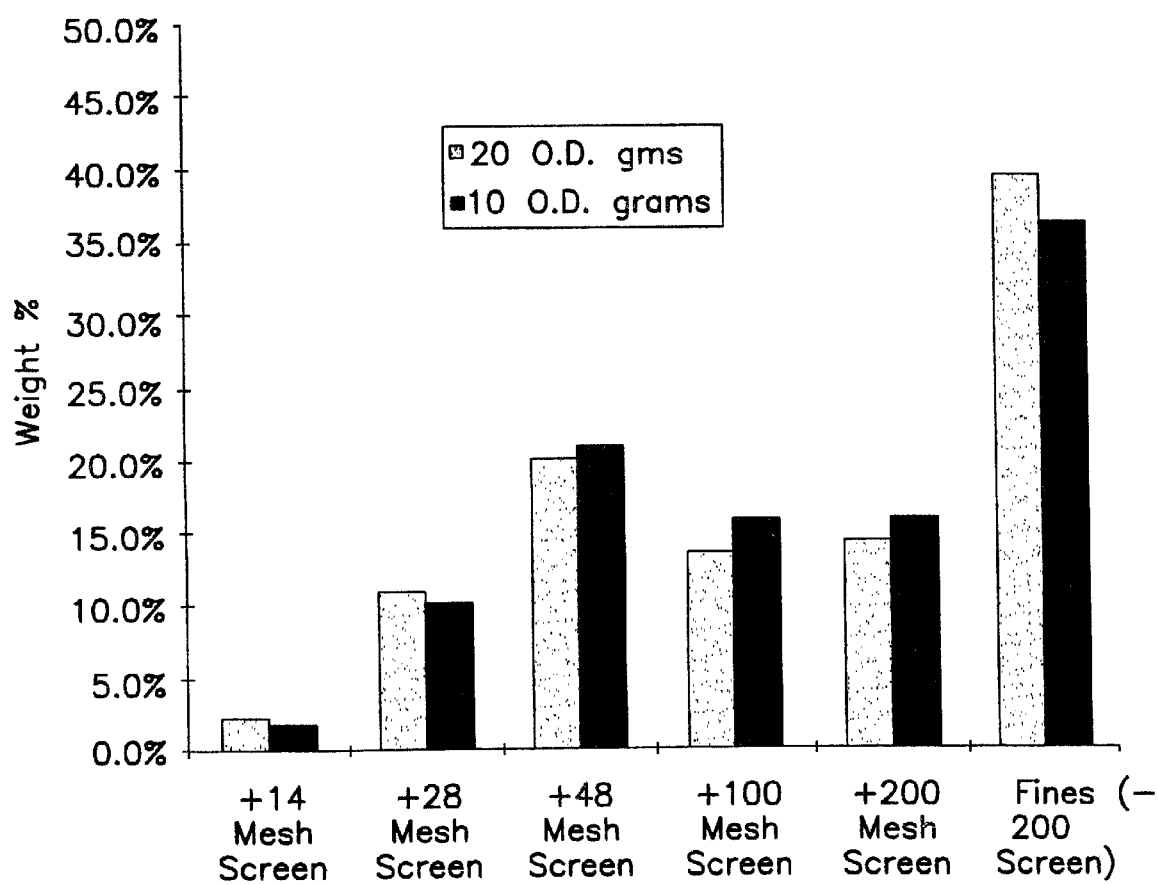
FIG. 1 is a graphical depiction of data comparing the screening efficiency of varying quantities of untreated waste sludge.

It is to be understood by one of ordinary skill in the art that the present discussion is a description of exemplary embodiments only, and is not intended as limiting the broader aspects of the present invention, which broader aspects are embodied in the exemplary construction.

The present invention addresses some of the objects and needs discussed above by providing a process using steam explosion to treat various fiber and fine containing waste streams. As used herein, "waste stream" refers to the waste stream from a waste paper recycling operation or the liquid waste stream (white water) from a paper manufacturing process, all of which may contain varying levels of fibers and fines within the waste.

The term "fiber" refers to natural fibers derived from vegetable matter and that has a length usually many times greater than its width, and that typically possesses tensile strength, pliability, and resistance to mechanical abrasion. This term may also encompasses similarly shaped man-made objects which may be present in waste paper products.

The term "fines" refers to short, naturally occurring fibers as well as fragments of fibers. Depending upon the underlying fiber process involved, the term "fines" may refer to different lengths of fibers. As broadly defined here, "fines" refers to the population of fibers within a fiber processing stream having an average length as determined by either a length average calculation or a weight average calculation, which falls outside a desired, useful range. Within a virgin paper-making operation which prefers longer, intact fibers, the average length of the fines may be greater than the fine population of a waste paper recycling facility.

No matter how defined, the population of fines heretofore considered as unsalvageable waste or of inferior quality can now be recovered. In doing so, the recovery process enhances the fiber-like qualities of the fines by increasing the curl value, increasing the fiber diameter along a portion of the fiber, and by increasing the wicking properties of the recovered, treated fines.

By way of example, the Kajaani FS-200 average fiber length present within the sludge utilized by the examples herein, fall within the range of 0.60 to 0.85 mm and which corresponds to a Kajaani FS-200 length weight average of between 1.75–2.00 mm. Accordingly, the average fiber length present within the waste sludge material is considered a "fine" for the purposes of this invention. Further, the fiber material which is shorter than the average range is also considered a fine. While the fiber material which has a length equal to or less than the average fiber length is considered a fine, it is recognized that longer fibers are also present in the waste stream. Such longer fibers are also recoverable and constitute a valuable recovered fiber product and which also has improved absorptive fiber properties. It is the longer population of fibers which are believed to be separated and retained on the Bauer-McNett classifier screen of 200 mesh or larger.

Heretofore, significant amounts of fibers and fines have been considered a waste product in tissue and paper production. The fibers and fines have historically proven difficult to isolate and contain a high degree of contaminants such as ash.

The ash content of recycled fiber sludge is indicative of the amount of additives which are incorporated in the waste paper. The ash content of the recycled sludge is generally about 20 to about 80%. Waste paper containing high filler and coating materials, for example, magazines, provides a recycled sludge having a high ash content. By way of comparison, newsprint de-inking mills generally produce a lower ash content waste sludge.

The ash content of the recycled fiber sludge employed in the methods of the present invention can vary and depends, for example, upon the source mill, the particular components of the recycled source material, and the like. However, it is believed that the beneficial effects of the present invention on the ash content, renders the invention suitable with all varying levels of ash content. Further, to the extent the present invention improves the physical properties of the fibers within the waste stream, such improvements occur irrespective of the ash content. Accordingly, a fiber-containing waste stream having a negligible ash content would provide a useful source of fibers for steam treatment.

In particular, fines have been considered a waste product in the tissue and paper production industry since fines typically retard water drainage, confer low air permeability to the formed webs or sheets, exhibit a higher degree of chemical reactivity which results in greater chemical cost, and tend to promote greater fiber-fiber bonding which, while increasing product strength, imparts an often undesired stiffness to the paper product. In particular, the fiber component from paper recycling waste sludge has heretofore been considered unsalvageable in that the reclaimed fibers have had an unacceptably high ash content.

In accordance with one aspect of the present invention is the discovery that the steam explosion of the waste sludge alters the fine shape. As set forth in co-inventor Sheng-Hsin Hu U.S. patent application Ser. No. 08/767,607 filed on Dec. 17, 1996 entitled "Treatment Process for Cellulosic Fibers" now abandoned and incorporated herein by reference, steam explosion can be used to increase the curl value of individual fibers. Further, the steam explosion has been found to increase the wicking properties of the resulting product incorporating the steam exploded fibers, and increases the separation efficiency of the fibers and fines from the waste sludge. The steam explosion permits the separation of fibers and fines from the waste sludge and does so in a manner which provides a population of recovered fibers having a low ash content. This recovered population of fibers has demonstrated improved burst index, tear index, tensile index, and tensile strength compared to handsheets incorporating a similar percentage of untreated sludge fibers.

It is understood and appreciated by those having ordinary skill in the art that the cellulosic fibers in the waste streams described herein will be substantially in the form of individual cellulosic fibers although some individual fibers may be in an aggregate form. The current process, then, is in contrast to known steam explosion processes that generally treat cellulosic fibers that are typically in the form of virgin wood chips or the like.

It is believed that the present steam treatment of the sludge and sludge fibers brings about changes to the fiber and fine properties which correspond closely with the results reported in the co-pending application referenced above.

It is believed that any combination of high pressure, high temperature, and time which is effective in achieving a desired degree of fiber modification is suitable for use in the present invention. Further, such combination of pressure, temperature and time are believed to have beneficial effects on the ash content of the sludge, thereby offering an improved quality of fiber while increasing the efficiency of fiber separation from the sludge.

As a general rule, it is believed that the cellulosic fibers in the waste material may be beneficially treated at a temperature in the range from about 130° C. to about 250° C., suitably from about 150° C. to about 225° C., more suitably from about 160° C. to about 225° C., and most suitably from about 160° C. to about 200° C.

The elevated temperature and pressures are applied over a time period within a range from about 0.1 minutes to about 30 minutes, beneficially from about 0.5 minutes to about 20 minutes, and suitably from about 1 minute to about 10 minutes. In general, the higher the temperature employed, the shorter the period of time generally necessary to achieve a desired degree of modification of the cellulosic fibers, fines, and ash present in the waste stream. As such, it may be possible to achieve essentially equivalent amounts of modification for different fiber-containing waste streams by using different combinations of high temperatures and times.

As a general rule, it is believed that the cellulosic fibers in the waste stream would be treated at a pressure that is super-atmospheric and within the range of about 40 to about 405 pounds per square inch, suitably from about 40 to about 230 pounds per square inch, and more suitably from about 90 to about 230 pounds per square inch.

Without intending to be bound by theory, it is believed that the steam explosion process causes the cellulosic fibers to undergo a physical modification. The physical modification includes a curling phenomenon which helps in the physical separation of the fibers as well as alters other properties such as liquid absorption or liquid handling capabilities.

The curl of a fiber may be quantified by a curl value which measures the fractional shortening of a fiber due to kink, twist, and/or bends in the fiber. As used in the present invention, a fiber's curl value is measured in terms of a two-dimensional plane, determined by viewing the fiber in a two-dimensional plane. To determine the curl value of fiber, the projected length of a fiber as the longest dimension of a two-dimensional rectangle encompassing the fiber (I) and the actual length of the fiber (L) are both measured. An image analysis method may then be used to measure L and I. A suitable analysis method is described in U.S. Pat. No. 4,898,642 incorporated herein in its entirety by reference. The curl value of a fiber can then be calculated from the following equation:

Curl value=$(L/I)-1$

It has been found in accordance with this invention that the cellulosic fibers following steam treatment are suitable for use in a wide variety of applications. One useful aspect of the recovered fibers and fines are that they may be reintroduced into the respective process stream associated with the initial waste stream used to isolate the fibers. It is believed that the recovered fibers and fines are suited for use in disposable absorbent products such as diapers, adult incontinent products, bedpans, sanitary napkins, tampons, and other absorbent products including wipes, bibs, wound dressings, surgical capes, and tissue-based products including facial or bathroom tissues, household towels, wipes, and related products. Accordingly, the present invention relates to a disposable absorbent product comprising the cellulosic fibers treated according to the process of the present invention. Further, in another aspect, the present invention relates to any paper product comprising the recovered and treated cellulosic fiber and fines treated in accordance with the present invention.

Test Procedures

Sludge Treatment

Approximately 100 grams of waste sludge at 45 percent consistency was obtained from a waste paper fiber recycling facility at Kimberly-Clark Corporation, Owensboro facility. The waste sludge was placed into a two-liter reactor vessel (Stake Technologies Ltd.) where high pressure steam was injected into the reactor thereby achieving a temperature of 202° C. and a pressure of 200 psi. The sludge was retained for time intervals of 2 minutes and 5 minutes. Following the appropriate retention time, a blow valve was opened and the sludge was blown into a collection tank maintained at ambient conditions. The collection tank was suitably vented so that transient pressure accumulations within the collection tank during the sludge discharge were minimized so as to achieve a rapid pressure drop of the sludge during the discharge step. Three repetitive runs were conducted for each retention time and the respective samples were combined for further analysis.

Fiber Collection

The two-minute and five-minute treated sludge samples along with control (untreated sludge) samples were subsequently dispersed in a British Disintegrator (Testing Machines, Inc.) for three minutes, and then evaluated with a Bauer-McNett classifier (Testing Machines, Inc.) for 20 minutes. The classifier comprises six ten-liter cells separated by 14, 28, 48, 100, and 200-mesh screens. All cells were filled with water and subjected to constant agitation. 10 and 20-gram samples of oven dry weight of the treated and control sludge were placed into respective first cells and passed through each screen in sequential order from the lowest to the highest mesh screen.

After 20 minutes, the water was drained from each cell and the classified sludge samples were collected, weighed, and evaluated for ash content using standard methods as established in TAPPI Test Method T-211-OM-93.

The collected samples which were retained by the 200-mesh screens or larger were combined and incorporated into wet-laid handsheets. The remaining material smaller than the 200-mesh screen was comprised largely of fines. While this population of fines was not used in the present examples, it is believed that these fines also show improvements in fiber quality similar to the results reported below.

Preparation of Wet-Laid Handsheet

A standard 7-½ inch by 7-½ inch handsheet was prepared using the desired fiber samples by using a 8 inch by 8 inch cast bronze wet-laid handsheet former mold, available from Voith Corporation. The handsheets had a basis weight of about 60 grams per square meter.

The handsheets were made using ratios of 30, 70 and 100 percent steam exploded recovered fibers mixed, when applicable, with the appropriate percentages of recycled fiber wet lap obtained from the Kimberly-Clark Owensboro facility. The recycled fiber wet lap is the recovered product, the production of which provided the original waste sludge which was used in the steam explosion treatment process.

A British Disintegrator mixer, available from Testing Machines, Inc, was filled with about 2 liters of distilled water at room temperature (23° C.) and about 45.0 grams of the fiber sample. The counter on the British Disintegrator was set to zero and was turned on until the counter ran to about 600. The contents of the British Disintegrator were then poured into a vessel filled with about 8 liters of distilled water.

The handsheet former, having an approximate 12 inch deep chamber, was filled with tap water to about 5 inches below the top of the handsheet former chamber. The contents of the bucket were then poured into the handsheet former chamber where a dedicated stirrer was then used to mix the suspension in the handsheet former chamber. The stirrer was moved slowly up and down 6 times to cause small vortexes, but to avoid causing large vortexes, in the square pattern of the handsheet former. The stirrer was then removed and the suspension was drained through the forming screen of the handsheet former. The handsheet former was then opened and two layers of blotting paper were placed on top of the handsheet. A roller, applying the equivalent of about 308 kilopascals of pressure inch, was moved back and forth one along each side and the center of the formed handsheet. The blotting paper, with the formed handsheet attached, was then lifted off the forming screen. The blotting paper was then placed on a table such that the formed handsheet faced upwards. An 18 inch, 4 mesh, stainless steel screen was placed on top of the handsheet. The blotting paper, handsheet, and screen were then flipped so that the screen was on the bottom and the blotting paper was on top. The blotting paper was then peeled off of the handsheet, leaving the handsheet on the screen. The handsheet is transferred, wire side up, to the polished convex surface of an 8 inch by 8 inch dryer hot plate. A canvas cover is placed over the convex surface and handsheet and is weighted down to prevent drying induced wrinkling. The handsheet is dried for 2 minutes and then removed for subsequent evaluation.

Recovered Fiber Properties

Figure 2:
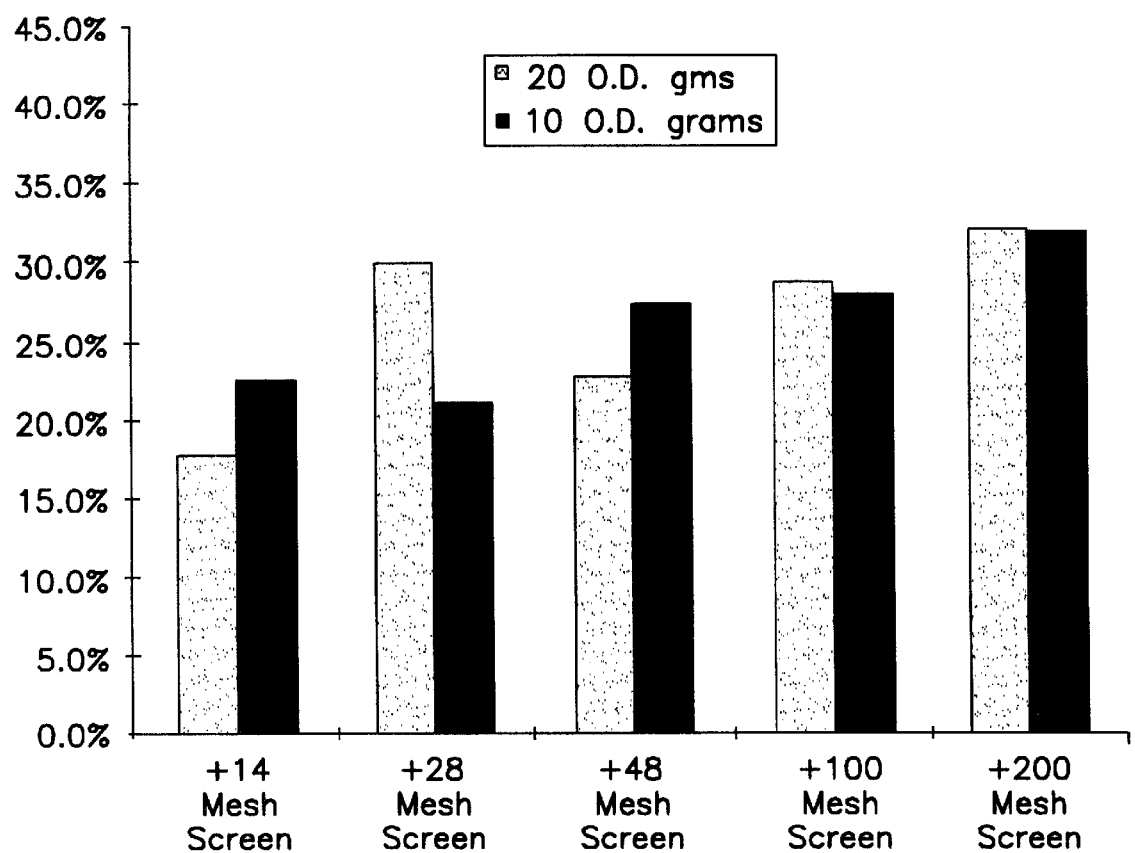
FIG. 2 is a graphical depiction of data comparing the screening efficiency with respect to ash content of varying amounts of untreated waste sludge.

Set forth in Table 1, and as further discussed in reference to the Figures, are various fiber properties as further discussed in reference to the accompanying figures. As seen in FIG. 1, it was initially determined that the loading concentration for control (untreated) samples within the Bauer-McNett classifier shows similar efficiencies at 10 oven dried gram and 20 oven dried gram loadings. As set forth in Table 1 and graphically represented in FIG. 2, the ash separation efficiency of control (untreated) sludge samples remain constant at the 10 and 20 gram loadings. Therein after, 20 gram loading runs were used to increase the amount of material collected and used in the remaining test. The data as depicted in FIG. 2 confirms experience within the industry that it is difficult to recover useful fibers from waste sludge since the recovered product has a high ash content which limits the use of the fibers.

Figure 3:
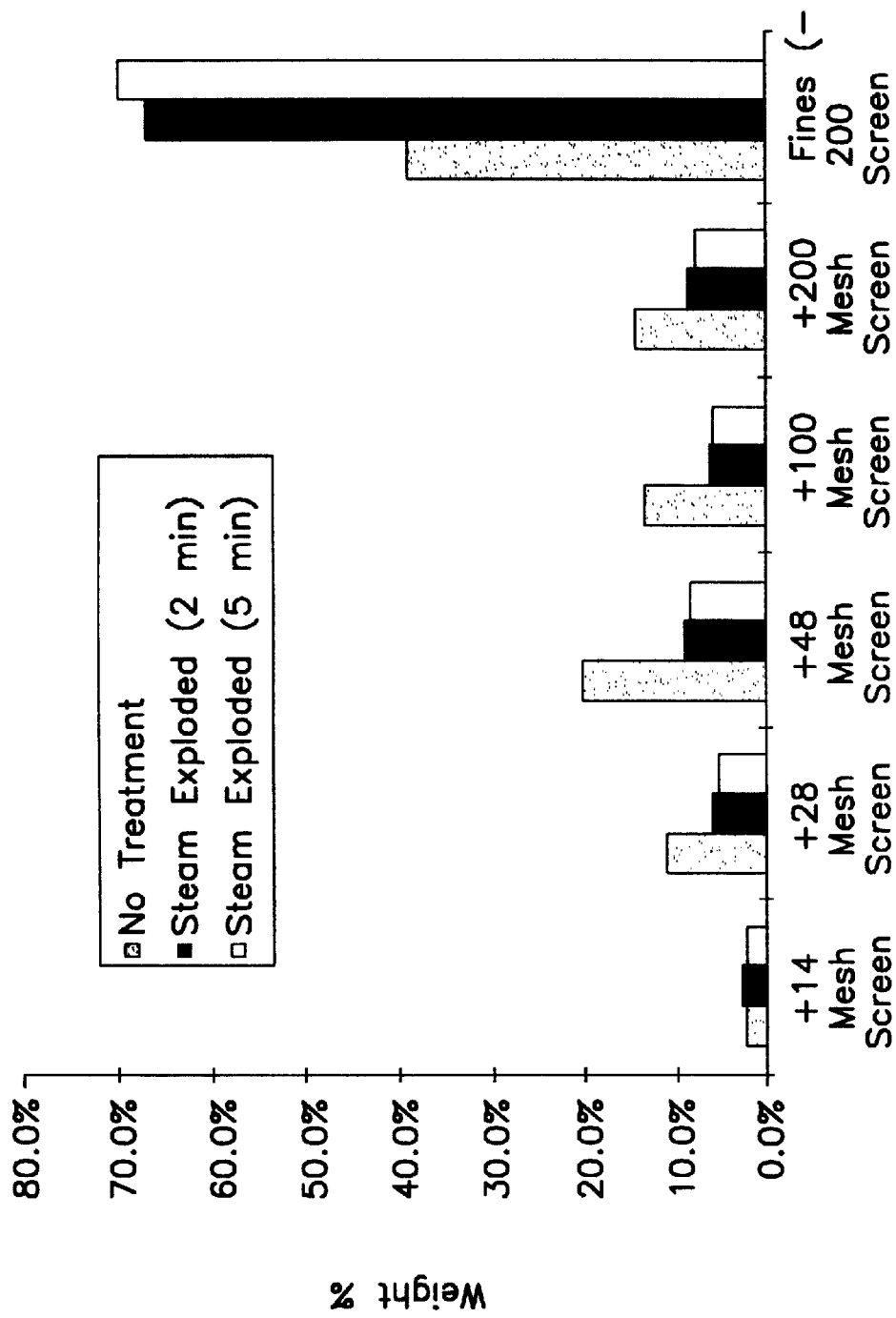
FIG. 3 is a graphical depiction of data comparing the screening efficiency of fibers and fines from waste sludge following treatment of the sludge by steam explosion.
Figure 4:
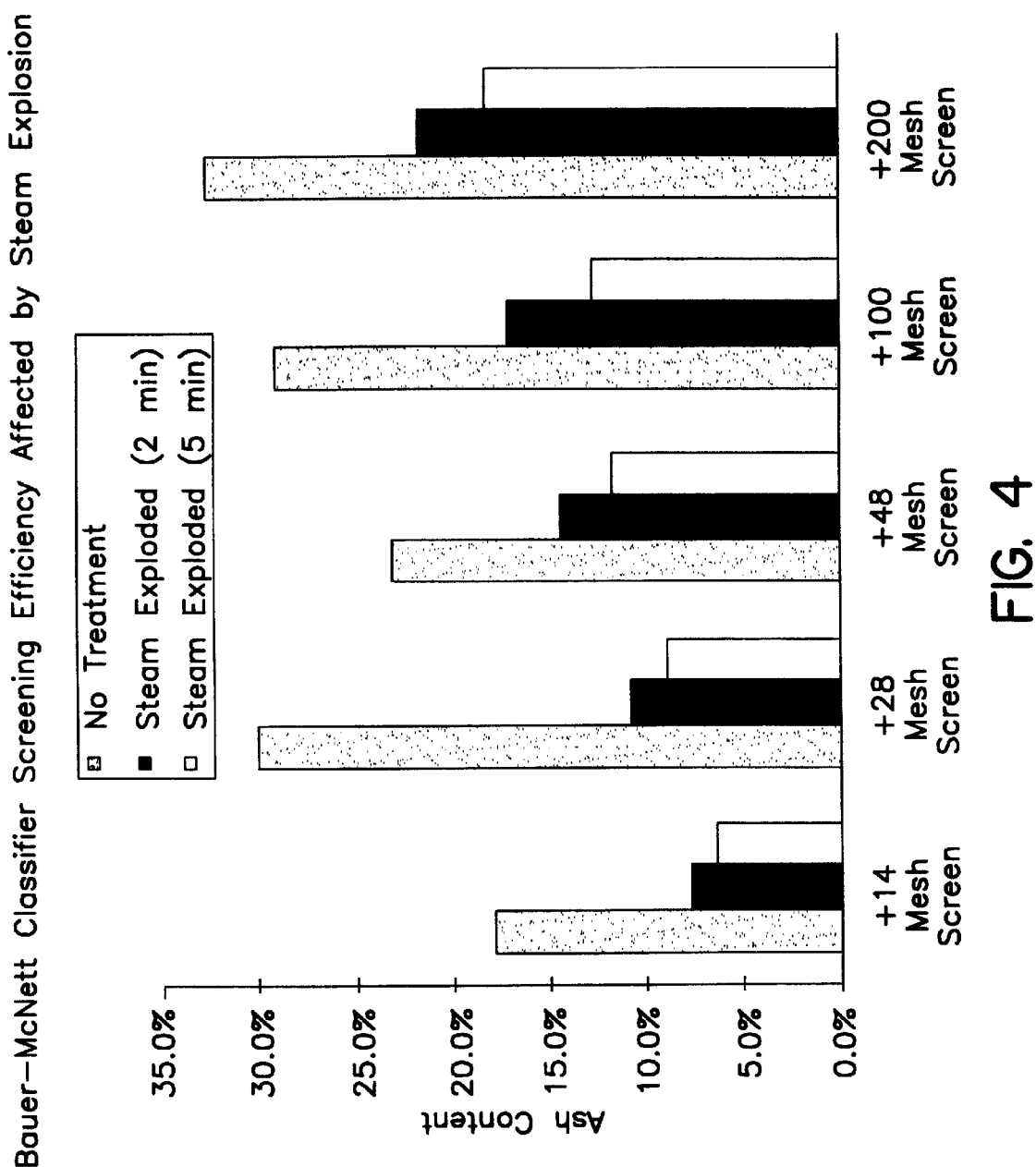
FIG. 4 is a graphical depiction of data setting forth the treated waste sludge retained ash content.

As set forth in FIG. 4, the ash content associated with recovered fibers from treated sludge is significantly reduced for both the 2 minute and 5 minute treatment intervals. This finding is further supported by the data set forth in FIG. 3 that indicates the combined weight of the 200 mesh and larger control group of recovered fibers from untreated sludge is higher than the weight of treated sludge recovered fibers. The combined data indicates that the untreated recovered fiber weight is greater as a result of the increased levels of ash particles. Stated another way, the steam treatment allows a fiber recovered product which has a significantly lower ash content than is otherwise obtained.

EXAMPLE 1
Canadian Standard Freeness Measurements

The prepared handsheets were subjected to several tests, namely Canadian Standard Freeness values, burst index, tensile index, tensile stretch, tear index, and opacity.

Figure 5:
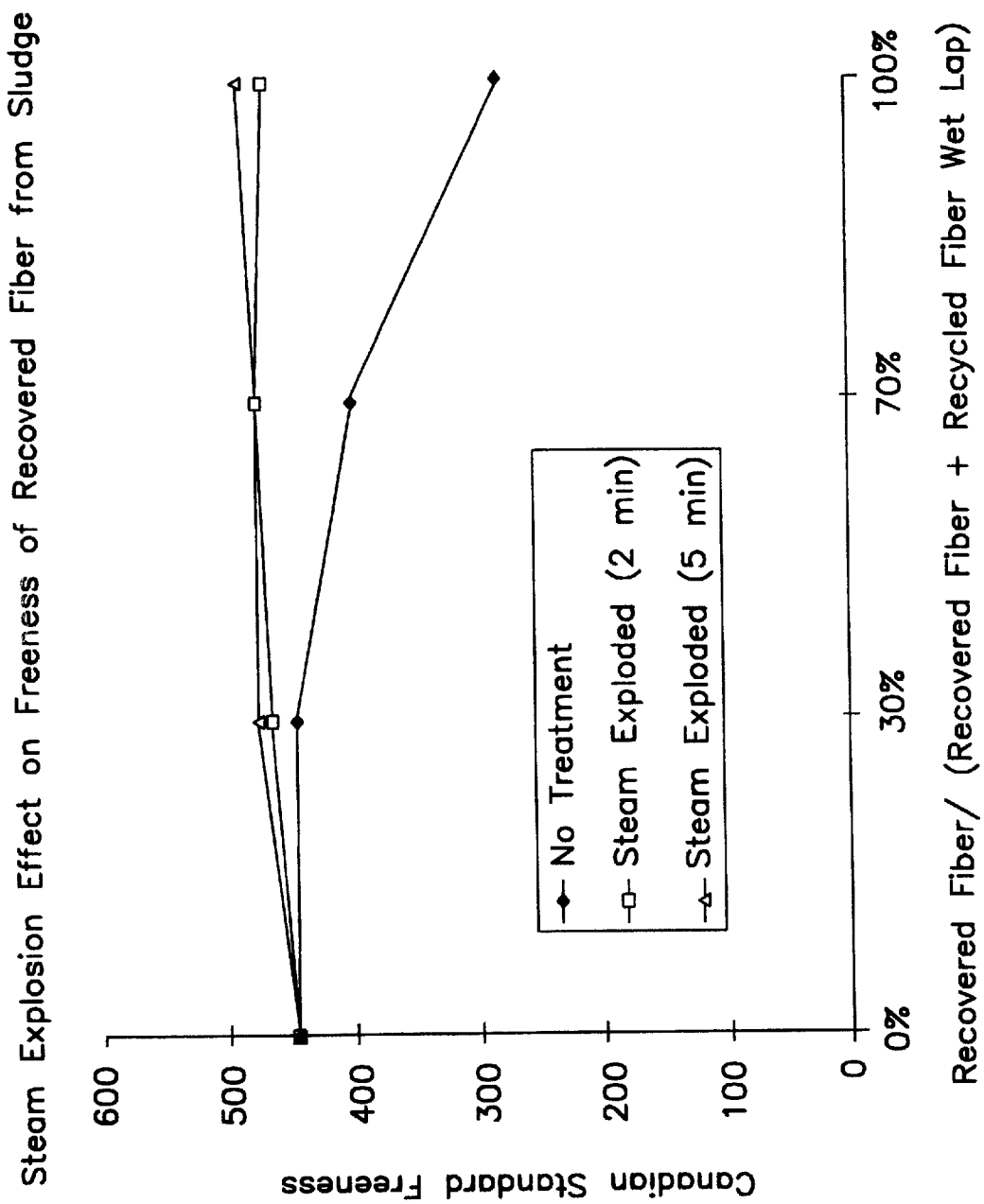
FIG. 5 is a graphical depiction of data comparing the Canadian Standard Freeness values of handsheets with varying levels of recovered fibers from treated sludge.

As best seen in reference to Table 2 and FIG. 5, handsheets prepared from the fibers recovered following steam explosion of the sludge compare favorably at 30 percent, 70 percent and 100 percent loading levels to the control sheet of zero percent treated fibers with respect to the Canadian Standard Freeness values. Canadian Standard Freeness values were determined according to protocols established in TAPPI Test Methods T-227 OM-94.

Compared to untreated fibers, the treated 100 percent recovered fiber improved the freeness values from a value of 300 to between 470 to 490. It is believed that the improvement are the results of a decrease in the fine and ash content in the reclaimed fibers along with steam explosion induced changes in fiber morphology.

EXAMPLE 2
Burst Index of Handsheets

The burst index of the handsheets were determined in accordance with established protocols in TAPPI Test Method T 403 "Bursting Strength of Paper" and as further referenced in TAPPI 220-sp-96 procedure for Physical Testing of Pulp Handsheets.

Figure 6:
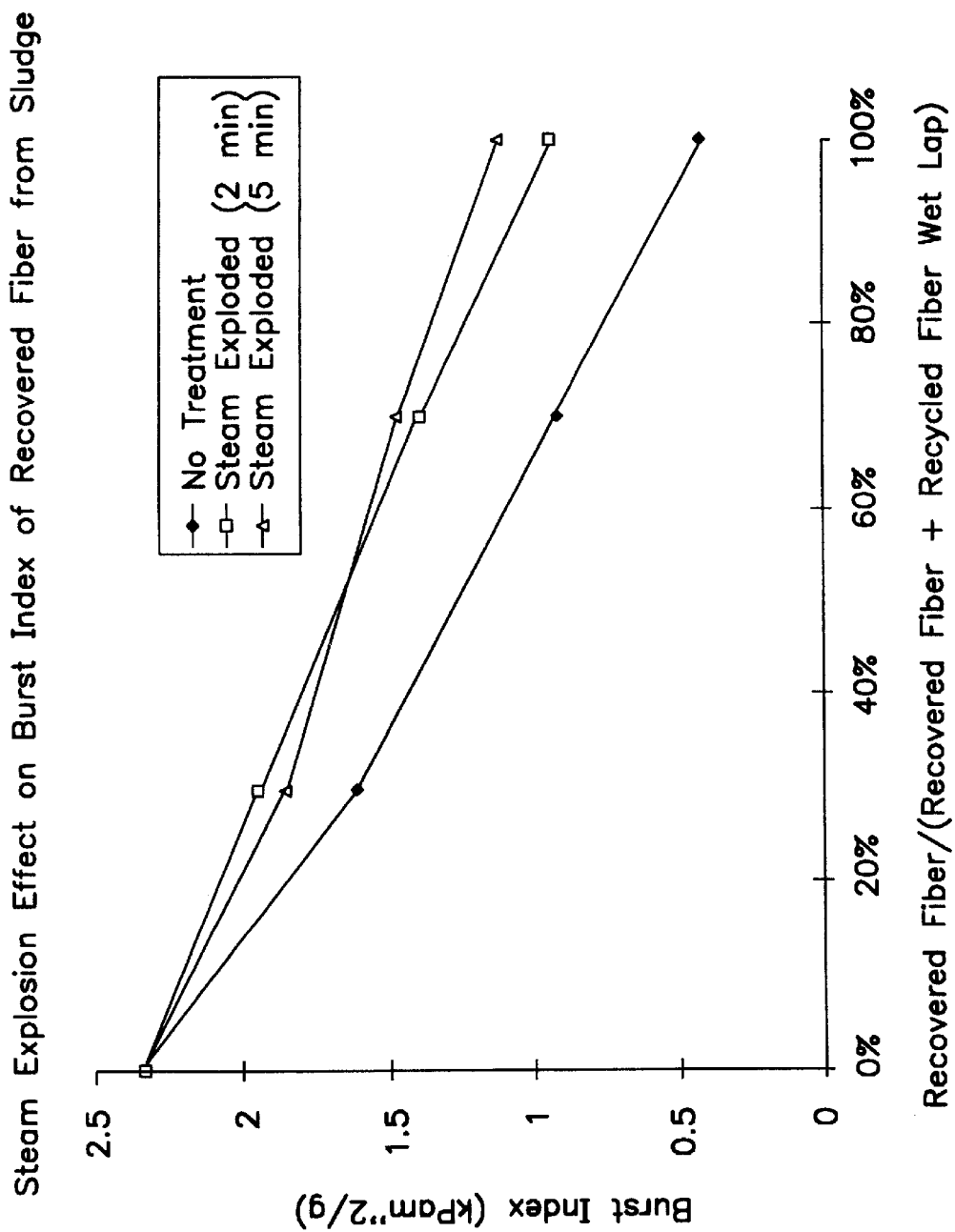
FIG. 6 is a graphical depiction of data comparing the burst index of handsheets prepared with varying levels of incorporated treated fibers.

As seen in Table 2 and in FIG. 6, the burst index of the handsheet using reclaimed fibers from treated sludge consistently exceeds the burst index of untreated sludge fibers.

EXAMPLE 3
Tensile Index Values of Handsheets

Tensile index of samples was calculated by dividing the sample tensile strength by the sample basis weight. Tensile strength refers to the maximum load or force (i.e., peak load) encountered while elongating the sample to break. The tensile strength was determined with an Instron Model 1122 Universal Test Instrument in accordance with Test Method TAPPI T 404 cm-82. Each sample was about 2.54 centimeters wide and the initial separation between the tester jaws prior to elongation was about 12.7 centimeters.

Figure 7:
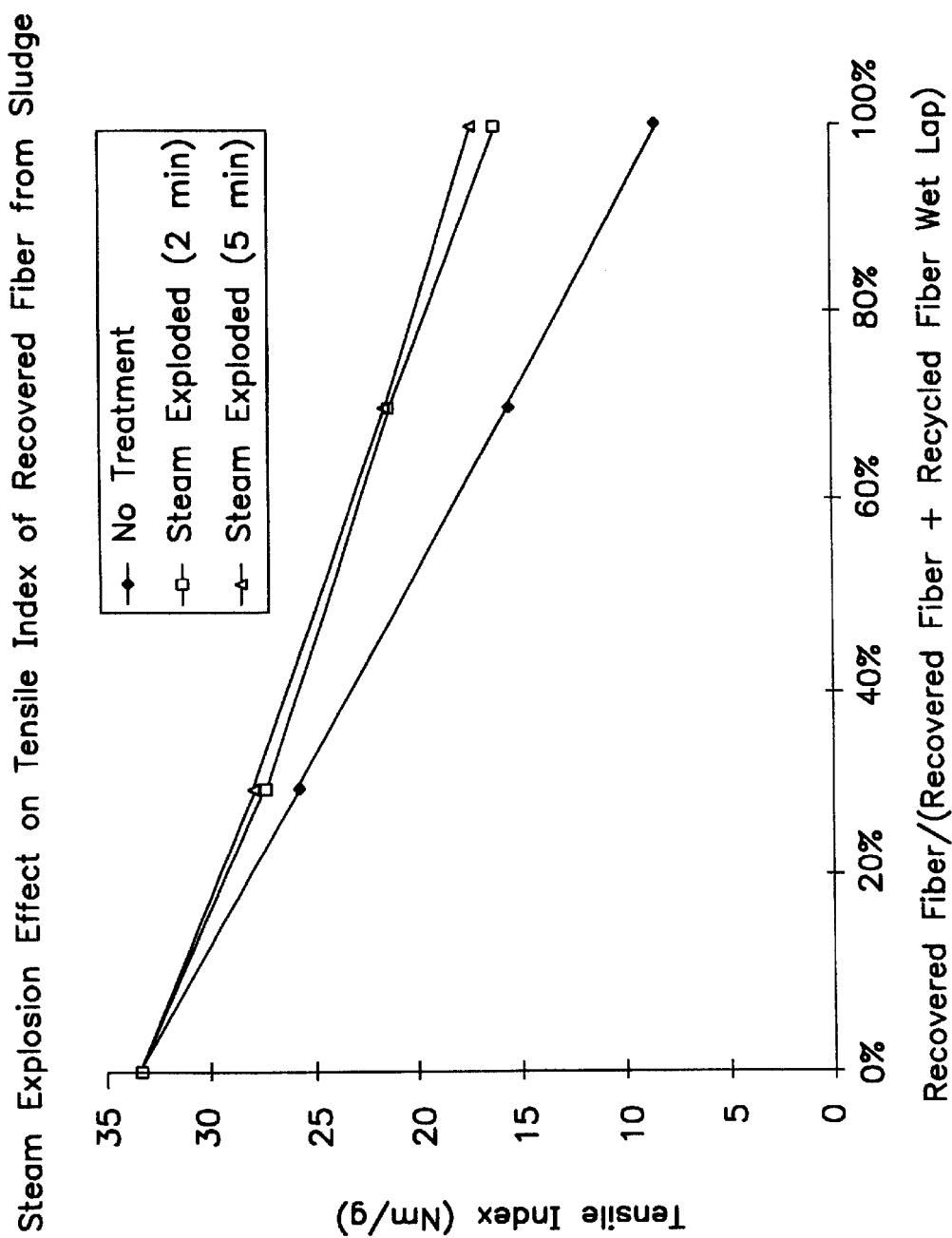
FIG. 7 is a graphical depiction of data comparing the tensile index for handsheets formed with varying levels of treated fibers.

The tensile index properties of sheets having reclaimed fibers, as seen in FIG. 7, exceeds the values of the untreated sludge fibers.

EXAMPLE 4
Tensile Stretch Values of Handsheets

Figure 8:
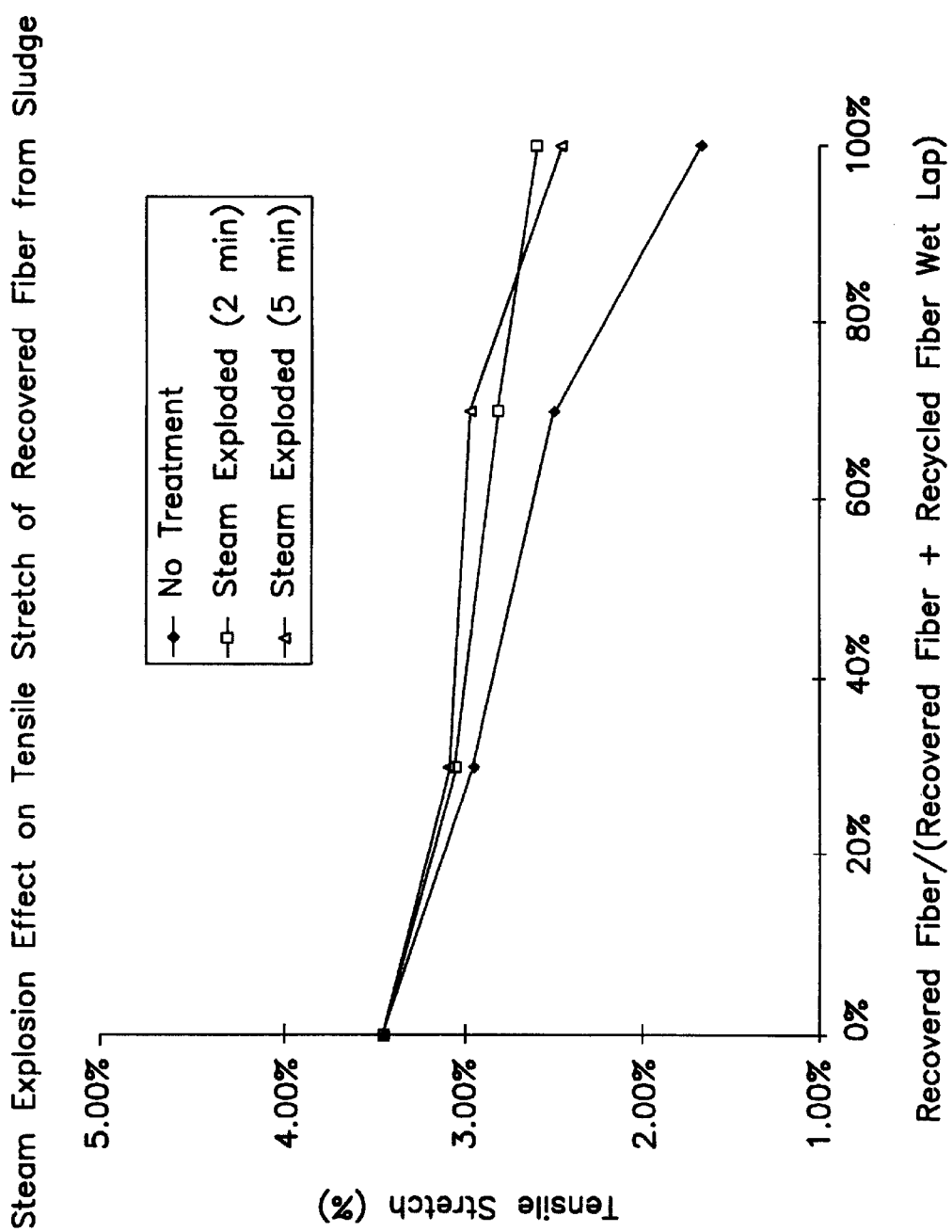
FIG. 8 is a graphical depiction of data comparing the tensile stretch for handsheets formed with varying levels of treated fibers.

The tensile stretch values are determined as a percentage of the tensile index values as set forth above in Example 3. As seen in reference to Table 2 and in FIG. 8, the tensile strength values of treated recovered fibers is improved compared to the untreated recovered fibers.

EXAMPLE 5
Tear Index of Handsheets

The tear index was calculated by dividing the tearing load by the sample basis weight. The tearing load measures the toughness of a material by measuring the work required to propagate a tear when part of a specimen is held in a clamp and an adjacent part is moved by the force of a pendulum freely falling in an arc.

The following method was used to determine the tearing load of the handsheets. This method determined the average force required to propagate a tear starting from a cut slit in the material being tested. The higher the number, the greater the force to tear the specimen.

This procedure is specific to a falling-pendulum (Elmendorf-type) instrument. Desirably, the tester is equipped with a pendulum that has a deep cutout (recessed area) on the pendulum sector and pneumatically-activated clamps. The tester used was sold under the trade designation Lorentzen and Wettre brand, Model O9ED. This tester may be obtained from Lorentzen Wettre Canada Inc., Fairfield, N.J. 07004.

In addition to the tester, a specimen cutter was used capable of providing 63.0±0.15 mm (2.5±0.006 in.) specimens. It is recommended that the specimens be cut no closer than 15 mm from the edge of the material and the specimens be taken only in areas that are free from folds, creases, and crimp lines. The handsheet specimens were cut to 63±0.15 mm by 73±1 mm and placed facing up in the same direction. Additional equipment included a 50 g weight.

Specimens were conditioned at laboratory conditions for 24 hours prior to testing. The tests were conducted in a standard laboratory atmosphere of 23±1° C. (73.4±1.8° F.) and 50±2% relative humidity.

The number of plies needed for the test results to fall between 20 to 60 on the linear range scale of the tear tester was determined. The 63 mm length of the handsheet specimens was run vertically on the tear tester.

The tester was placed a level surface free from noticeable vibrations and leveled. Afterwards, testing of a specimen was begun by verifying that the power was on. Next, the rotary dial was set to the number of plies to be torn. That being done, the number button was pushed and the cutting lever was pushed down. Afterwards, the digital readout was verified as correct. Next, the specimen was placed between the clamps with the edge of the specimen aligned with the front edge of the clamp. If more than one sheet was tested, the sheets were placed facing in the same direction. That being done, the clamp button was pushed to close the clamps. Afterwards, a slit was cut in the specimen by pushing down on the cutting knife lever until it reaches its stop. The slit was clean with no tears or nicks. Next, the pend button was pushed to release the pendulum. That being done, the pendulum was caught on the back swing and positioned to the starting position after the pendulum traveled one full swing. Afterwards, the pend button was depressed to raise the stop once the pendulum was behind it. The value was recorded unless the tear line deviated more than 10 millimeters. If the deviation was more than 10 millimeters, the specimen was discarded and a new specimen tested.

The results were recorded in grams centimeter. The values were reported to the nearest whole number. The following conversion factors were used with units which had a 1600-gram capacity and did not automatically convert the test result:

| # of sheets | Multiply by | # of sheets | Multiply by |
|---|---|---|---|
| 1 sheet | 16 | 8 sheets | 2 |
| 2 sheets | 8 | 10 sheets | 1.6 |
| 4 sheets | 4 | 12 sheets | 1.33 |
| 5 sheets | 3.2 | 16 sheets | 1 |

Figure 9:
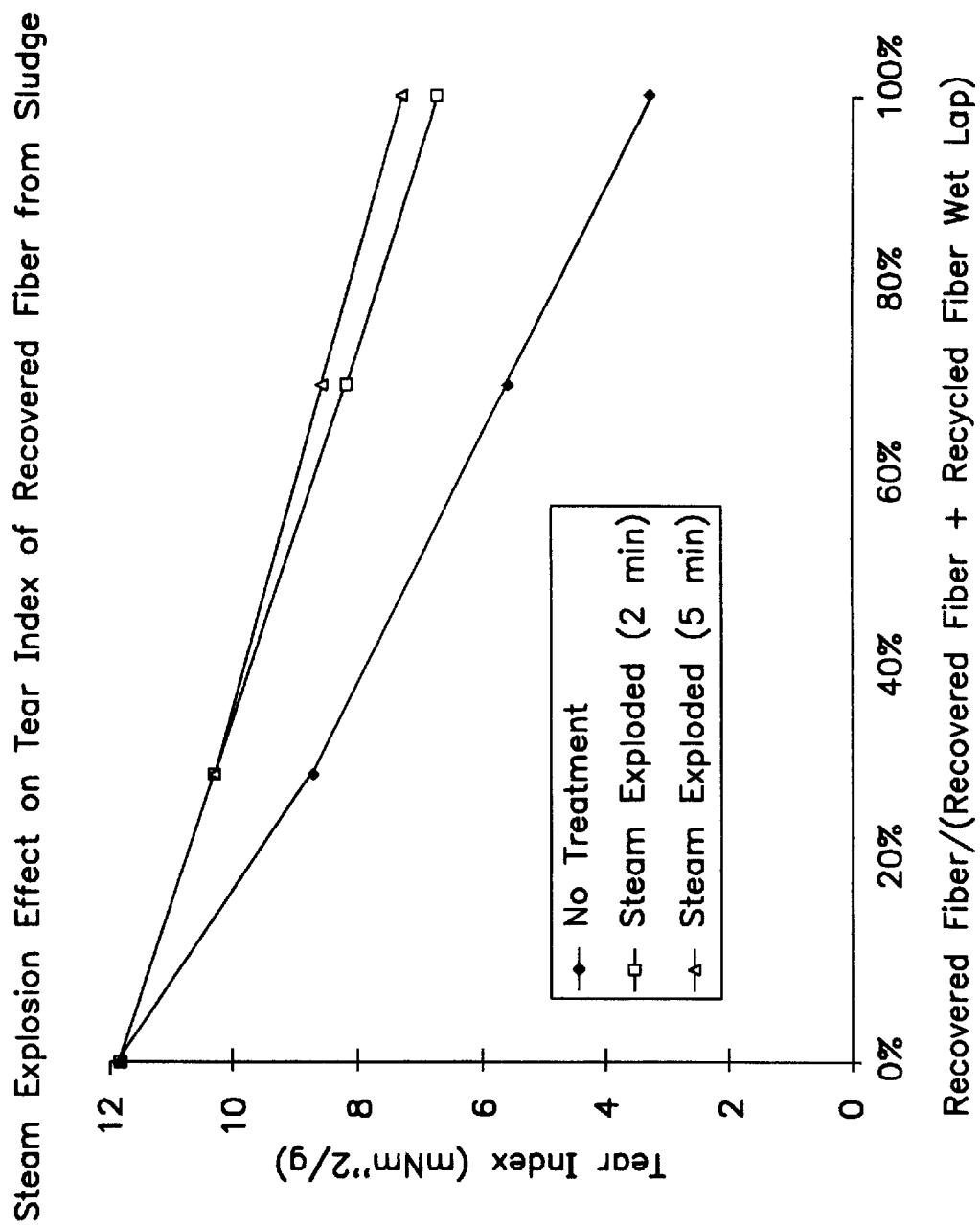
FIG. 9 is a graphical depiction of data comparing the tear index for handsheets formed with varying levels of treated fibers.

As seen in reference to Table 2 and in FIG. 9, improvements are seen in the tear index values of the recovered fibers.

EXAMPLE 6

Opacity Determinations

Figure 10:
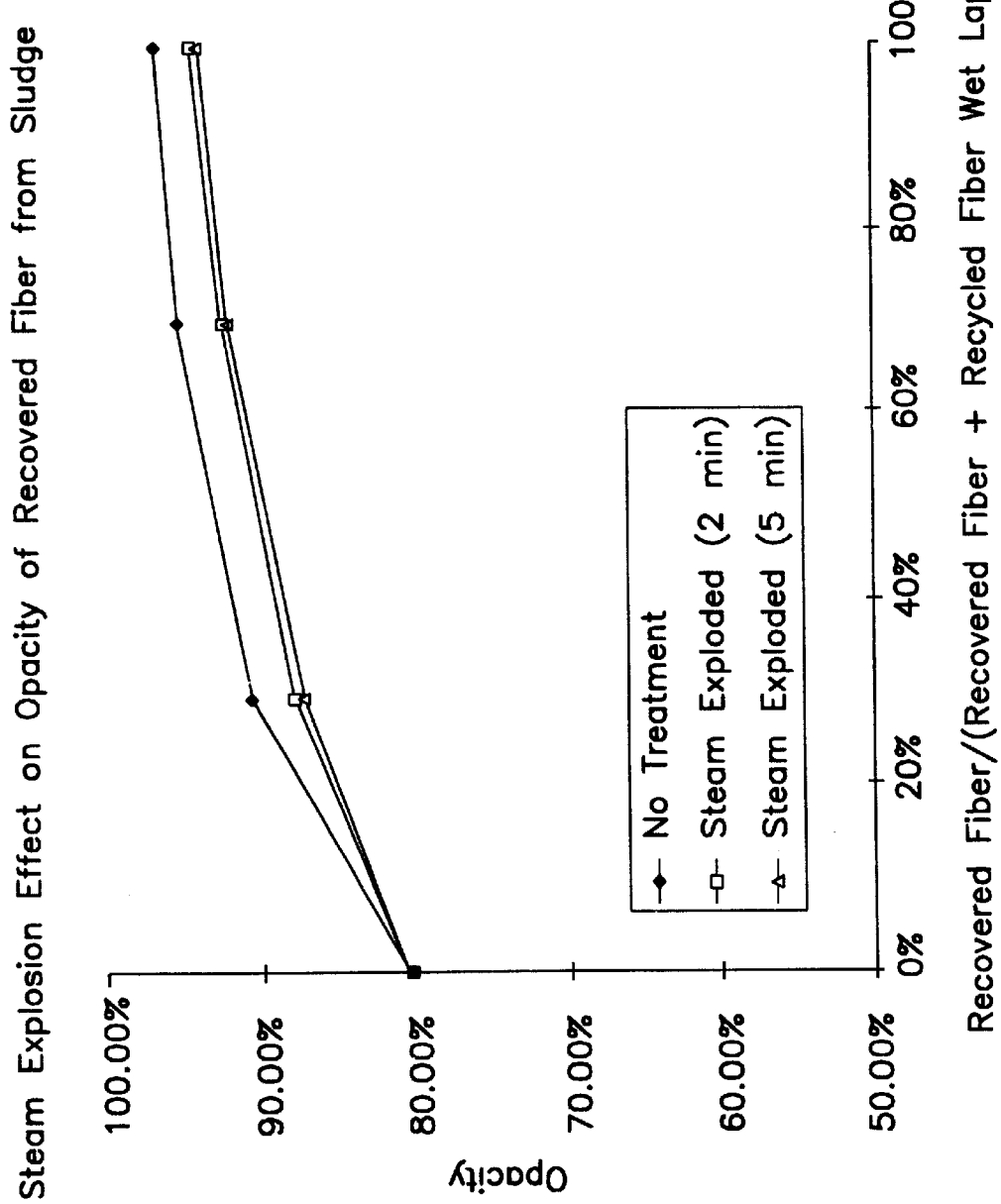
FIG. 10 is a graphical depiction of data comparing the effect on opacity of various fiber levels incorporated into handsheets.

The opacity coefficient was determined in accordance with established protocols in TAPPI test method T 220 sp-96 and is set forth in Table 2 and illustrated graphically in FIG. 10.

As recorded in Table 2, additional measurements of specific volume, tensile energy absorption, scattering coefficient and porosity determinations were evaluated and recorded. The evaluations conform to TAPPI standards. The specific volume was determined by measuring the thickness of the paper and dividing by the measured papers' basis weight. The thickness of the paper was determined in accordance with TAPPI standard T 411 om-89. The procedure deviated from the TAPPI standard by measuring the thickness of five specimens rather than the ten TAPPI specimens in conducting three measurements rather than five TAPPI measurements.

In reference to Table 2 and to FIG. 10, handsheets incorporating recovered treated fibers have a lower opacity than handsheets with untreated recovered fibers. Again, the lower opacity of the treated recovered fibers is attributed to a lower ash content of the source fibers.

While not wishing to be limited by theory, it is believed that the above noted improvements to fiber separation and fiber quality are indicative of several changes brought about by the steam explosion treatment. One, it is seen that the treatment of the waste sludge has a beneficial effect on the separation dynamics of the particulate ash. The steam treatment may render a smaller ash particle size, making the fiber/ash separation easier.

A second noted benefit of the steam explosion treatment process is that the quality of the recovered population of fibers has improved fiber characteristics as evaluated in the handsheet properties. It is believed that the steam treatment process alters the fiber morphology by increasing the curl index as well as increasing the fiber diameter. As noted in the co-inventor's application referred to and incorporated by reference above, the steam explosion of isolated cellulosic fibers improves the fibers liquid absorption and liquid handling properties.

Both the increase in curl index and the change in morphology provide similar separation efficiency in fines. While the fine population, as determined by the fiber/fine residue which passed through #200 and larger mesh screen, was not separately evaluated, the fines are believed to undergo similar changes. As noted above, the separation efficiency of the fines from ash is increased. As such, a recovered population of fines may be separated from the waste, reducing the solid content of the waste stream. Further, it is believed that the cellulosic fines, following steam treatment, also have improved fiber qualities compared to untreated fines. As such, the treated fines can be incorporated into certain paper products.

To the extent the steam explosion treatment alters the cellulosic fibers' morphology, it should be noted that the population of recovered fibers likely contained material which, untreated, would have been classified as a fine. In other words, the curling and diameter changes seen in steam-treated fibers likely produced altered fines having an increased curl index and/or larger diameter. Either event increases the number of fines which would be captured in the Bauer McNett classifier along with the longer fiber population. As such, the data supports the conclusion that increased loadings of fines and fibers from steam treated sludge can be added to paper products.

The above embodiments are directed towards a recovered fiber product from the waste sludge of a paper recycling facility. However, the scope of the present invention is not limited to any specific waste stream. Virgin chipping operations and paper making operations all generate a waste stream which contains significant levels of fibers and fines in the waste stream. The current invention provides a process which can increase the recovery of fibers and fines from the waste stream. Further, the steam explosion improves the recovered fibers characteristics useful in paper products.

Although desired embodiment of the invention has been described using specific terms, devices, and methods, such description is for illustrative purposes only. The words used are words of description rather than of limitation. It is to be understood that changes and variations may be made by those of ordinary skill in the art without departing from the spirit and scope of the present invention which is set forth in the following claims. In addition, it should be understood that aspects of the various embodiments may be interchanged, both in whole or in part.

TABLE 1

| | OWENSBORO SLUDGE | | | |
|---|---|---|---|---|
| | AS-IS | | STEAM EXPLODED 2 MIN/200 C/45% CONS | STEAM EXPLODED 5 MIN/200 C/45% CONS |
| SAMPLE ID | (20 O.D.) (Grams) | (10 O.D.) (Grams) | (20 O.D.) (Grams) | (20 O.D.) (Grams) |
| BAUER-McNETT CLASSIFICATION | | | | |
| +14 Mesh Screen (%) | — | 2.3 | 1.6 | 2.6 | 2.1 |
| +28 Mesh Screen (%) | — | 10.8 | 10.0 | 5.8 | 5.3 |
| +48 Mesh Screen (%) | — | 20.0 | 20.8 | 9.0 | 8.5 |
| +100 Mesh Screen (%) | — | 13.4 | 15.8 | 6.2 | 5.9 |
| +200 Mesh Screen (%) | — | 14.2 | 15.7 | 8.6 | 7.9 |

TABLE 1-continued

| | OWENSBORO SLUDGE | | | |
|---|---|---|---|---|
| | AS-IS | | STEAM EXPLODED 2 MIN/200 C/45% CONS | STEAM EXPLODED 5 MIN/200 C/45% CONS |
| SAMPLE ID | (20 O.D.) (Grams) | (10 O.D.) (Grams) | (20 O.D.) (Grams) | (20 O.D.) (Grams) |
| Fines (−200 Screen) (%) | — | 39.3 | 36.1 | 67.8 | 70.3 |
| ASH CONTENT (Bauer-McNett Fractions) | | | | |
| +14 Mesh Screen (%) | — | 17.8 | 22.6 | 7.8 | 6.3 |
| +28 Mesh Screen (%) | — | 29.9 | 21.1 | 10.6 | 8.7 |
| +48 Mesh Screen (%) | — | 23.0 | 27.5 | 14.3 | 11.6 |
| +100 Mesh Screen (%) | — | 29.0 | 28.3 | 17.0 | 12.7 |
| +200 Mesh Screen (%) | — | 32.5 | 32.4 | 21.6 | 18.1 |
| AS-IS SAMPLE (No Fines Removal) (%) | — | 30.2 | — | — | — |

TABLE 2

| | STANDARD HANDSHEETS | | | | | | | | | |
|---|---|---|---|---|---|---|---|---|---|---|
| | | AS-IS | | | STEAM EXPLODED 2 MIN/200 C/45% CONS | | | STEAM EXPLODED 5 MIN/200 C/45% CONS | | |
| | OWENSBORO | Fines Removed By Bauer-McNett Classifier | | | | | | | | |
| SAMPLE ID | RECYCLED FIBERS | % Sludge Blended With Recycled Fibers | | | % Sludge Blended With Recycled Fibers | | | % Sludge Blended With Recycled Fibers | | |
| SI CONVERTED AVERAGE TEST DATA | WET LAP | 30% | 70% | 100% | 30% | 70% | 100% | 30% | 70% | 100% |
| C.S. Freeness (ml) | 445 | 445 | 400 | 300 | 465 | 475 | 470 | 475 | 475 | 490 |
| Burst Index (kPam$^2$/g) | 2.34 | 1.61 | 0.92 | 0.42 | 1.94 | 1.39 | 0.94 | 1.85 | 1.47 | 1.13 |
| Specific Volume (cm$^3$/g) | 2.20 | 3.12 | 3.46 | 3.53 | 3.12 | 3.06 | 3.55 | 2.93 | 3.07 | 3.53 |
| Tear index (mNm$^2$/g) | 11.80 | 8.73 | 5.62 | 3.35 | 10.26 | 8.21 | 6.80 | 10.28 | 8.58 | 7.36 |
| Tensile Index (Nm/g) | 33.42 | 25.80 | 15.58 | 8.49 | 27.31 | 21.32 | 16.29 | 27.82 | 21.47 | 17.41 |
| Stretch (%) | 3.45 | 2.94 | 2.50 | 1.67 | 3.04 | 2.81 | 2.59 | 3.08 | 2.95 | 2.45 |
| Tensile Energy Absorp. (J/m$^2$) | 46.18 | 29.43 | 14.70 | 4.70 | 32.92 | 23.36 | 16.07 | 33.67 | 24.82 | 16.29 |
| Opacity, ISO (%) | 80.3 | 90.7 | 95.5 | 97.0 | 87.9 | 92.5 | 94.7 | 87.3 | 92.2 | 94.1 |
| Scattering Coeff. (m$^2$/kg) | 37.06 | 37.93 | 39.28 | 38.80 | 38.28 | 39.47 | 41.35 | 37.77 | 39.95 | 40.68 |
| Porosity, Gurley (s/100 ml) | 2.6 | 2.2 | 2.1 | 1.0 | 2.0 | 1.6 | 1.4 | 2.2 | 1.9 | 1.3 |
| Porosity, Frazier (cfm/ft$^2$) | 31.3 | 44.9 | 52.0 | 72.7 | 45.1 | 59.9 | 63.1 | 43.6 | 47.2 | 67.7 |

What is claimed is:

1. A process of recovering fibers comprising:
    providing a waste sludge from a waste paper recycling facility comprising a plurality of previously de-fibered, individual fibers and fines;
    placing said waste sludge in a first vessel;
    bringing an interior of said vessel and said waste sludge to an elevated temperature and pressure;
    maintaining said elevated temperature and pressure for an effective time interval;
    discharging said waste sludge from said first vessel to a second vessel, said second vessel being sufficiently vented to maintain a pressure drop during said discharge step, and to thereby provide a treated sludge product comprising treated fibers and fines;
    passing said treated sludge through a separator to separate and collect a portion of said treated fibers and said treated fines from said sludge.

2. The process according to claim 1, wherein said elevated temperature is within the range of about 130° C. to about 250° C.

3. The process according to claim 1, wherein said effective time interval is between about 0.5 minutes to about 30 minutes.

4. The process according to claim 1, wherein said elevated pressure is about 100 to about 300 psi.

5. A process of converting waste fibers comprising:
    providing a waste stream comprising a mixture of previously de-fibered, individual fibers from a fiber processing facility;
    exposing said waste stream to an elevated temperature and pressure;
    releasing rapidly said pressure from said waste stream, thereby providing a plurality of treated fibers within a treated waste stream; and
    separating said treated fibers from said waste stream, said treated fibers having improved fiber properties than an untreated population of de-fibered, individual fibers.

6. The product according to the process of claim 5 wherein said mixture of fibers further comprises a plurality of individual fines.

7. The process according to claim 5 wherein said elevated temperature is within the range of about 130° C. to about 250° C.

8. The process according to claim 5 wherein said elevated pressure is about 100 to about 300 psi.

9. The process according to claim 5 wherein said waste stream is from a waste paper recycling operation.

10. The process according to claim 5 wherein said waste stream is from a paper making operation.

11. A process of converting waste fibers comprising:

providing a waste stream from a de-fibering operation of a paper making or paper recycling facility, comprising a mixture of a plurality of individual fibers;

exposing said waste stream to an elevated temperature and pressure;

releasing rapidly said pressure from said waste stream, thereby providing a plurality of treated fibers within a treated waste stream; and separating said treated fibers from said waste stream.

12. The process according to claim 11 wherein said separated treated fibers are reintroduced into a paper making process stream.

13. A process of improving the useful properties of fibers comprising:

providing a first supply of individual and disassociated fibers, said fibers contained within a waste stream from a paper fiber processing operation;

subjecting said waste stream containing said individual and disassociated fibers to an elevated temperature;

discharging said waste stream at an elevated temperature from a first pressure environment to a second pressure environment, said first pressure being greater than said second pressure;

separating a portion of said individual and disassociated fibers from said waste stream, thereby providing a second supply of fibers, said second supply of fibers having improved fiber qualities than untreated fibers.

14. The process according to claim 13 wherein said separating step further comprises separating a supply of treated fines from said treated waste stream.

15. The process according to claim 14 wherein said supply of fines have improved fiber properties for paper product usage than said first supply of fines.

16. The process according to claim 13 wherein said waste stream further comprises a waste stream from a paper recycling facility.

17. The process according to claim 13 wherein said waste stream is from a waste paper recycling operation.

18. The process according to claim 13 wherein said waste stream is from a paper making operation.

19. A process of recovering fibers from waste paper recycling sludge comprising:

providing a waste sludge consisting essentially of a plurality of individual fibers, and individual fines;

placing said waste sludge in a first vessel;

bringing an interior of said vessel and said waste sludge to an elevated temperature and pressure;

maintaining said elevated temperature and pressure for an effective time interval; discharging said waste sludge from said first vessel to a second vessel, said second vessel being sufficiently vented to maintain a pressure drop during said discharge step, and to thereby provide a treated sludge product comprising treated fibers and fines;

passing said treated sludge through a separator to separate and collect a portion of said treated fibers and said treated fines from said sludge.

20. A process of recovering fibers and fines from a waste sludge comprising:

providing a source of individual fibers and fines said source consisting essentially of a waste sludge from a fiber processing facility;

placing said waste sludge in a first vessel;

bringing an interior of said vessel and said waste sludge to an elevated temperature and pressure;

maintaining said elevated temperature and pressure for an effective time interval;

discharging said waste sludge from said first vessel to a second vessel, said second vessel being sufficiently vented to maintain a pressure drop during said discharge step, and to thereby provide a treated sludge product comprising treated fibers and fines;

passing said treated sludge through a separator to separate and collect a portion of said treated fibers and said treated fines from said sludge.

* * * * *